(12) United States Patent
Huang

(10) Patent No.: US 8,294,028 B2
(45) Date of Patent: Oct. 23, 2012

(54) POWER SUPPLY SOCKET PANEL

(76) Inventor: Huadao Huang, Yueqing (CN)

( * ) Notice: Subject to any disclaimer, the term of this patent is extended or adjusted under 35 U.S.C. 154(b) by 0 days.

(21) Appl. No.: 13/108,033

(22) Filed: May 16, 2011

(65) Prior Publication Data

US 2011/0209891 A1 Sep. 1, 2011

Related U.S. Application Data

(63) Continuation-in-part of application No. 12/830,369, filed on Jul. 5, 2010.

(30) Foreign Application Priority Data

Aug. 27, 2009 (CN) .................. 2009 2 0173441 U
May 18, 2010 (CN) .................. 2010 2 0199074 U

(51) Int. Cl.
*H02G 3/14* (2006.01)

(52) U.S. Cl. ............ 174/66; 174/67; 220/241; 220/242; 439/536; D13/177

(58) Field of Classification Search .............. 174/66, 174/67, 17 CT, 50, 53, 57, 58; 220/3.2, 3.3, 220/241, 242, 3.8; 439/536, 142, 135, 148, 439/149; D13/156, 177; D8/353
See application file for complete search history.

(56) References Cited

U.S. PATENT DOCUMENTS

| 4,835,343 | A | * | 5/1989 | Graef et al. ................... | 174/66 |
|---|---|---|---|---|---|
| 5,073,681 | A | * | 12/1991 | Hubben et al. .................. | 174/66 |
| 5,895,888 | A | * | 4/1999 | Arenas et al. ................... | 174/66 |
| 6,278,062 | B1 | * | 8/2001 | Sowdon .......................... | 174/66 |
| 6,840,800 | B2 | * | 1/2005 | Kidman ........................ | 174/66 |
| 7,030,319 | B2 | * | 4/2006 | Johnsen et al. ................. | 174/66 |
| 7,071,414 | B2 | * | 7/2006 | Kim .............................. | 174/66 |
| 7,279,636 | B2 | * | 10/2007 | Oddsen et al. .................. | 174/66 |
| 7,456,358 | B2 | * | 11/2008 | Swiencicki et al. ............ | 174/66 |
| 7,538,271 | B2 | * | 5/2009 | O'Young et al. ................ | 174/66 |
| 7,947,903 | B2 | * | 5/2011 | Peck .............................. | 174/66 |
| 8,101,860 | B1 | * | 1/2012 | Shotey et al. .................. | 174/66 |

* cited by examiner

*Primary Examiner* — Angel R Estrada
(74) *Attorney, Agent, or Firm* — Mei & Mark LLP

(57) ABSTRACT

A power supply socket panel comprises a panel enclosure, at least one movable connector, a panel supporter and at least one elastic foot. The panel supporter is mounted to the movable connector, and together they are secured to a power supply socket or switch. The panel enclosure is secured to the panel supporter through the movable connector and the elastic foot is mounted between the panel supporter and the movable connector. During disassembly, the connection component is pressed with hard tools such as a small screwdriver so that the elastic foot is in a compressed state, allowing the panel enclosure to separate from the connection component. In this way, the panel enclosure can be removed. This panel is characterized by a simple structure and convenient assembly/disassembly.

19 Claims, 6 Drawing Sheets ical Field

POWER SUPPLY SOCKET PANEL

CLAIM FOR PRIORITY

This application claims priority under 35 U.S.C. §119 to Chinese Patent Application No. 201020199074.X filed May 18, 2010, the content of which is incorporated herein by reference in its entirety. This application is a continuation-in-part of U.S. application Ser. No. 12/830,369 entitled "Outlet or Switch Panel" filed Jul. 5, 2010, which claims the benefit of priority to Chinese Patent Application No. 200920173441.6 filed Aug. 27, 2009, the contents of which are incorporated herein by reference in their entirety.

TECHNICAL FIELD

The present invention relates to a panel which is mounted on the surface of a power supply socket/switch or similar article for the purposes of decoration.

BACKGROUND

Currently most power supply sockets/switches have panels mounted on their surfaces to make the power supply socket/switch appear more beautiful and elegant, Usually the panel is secured to the wall-mounted power supply socket/switch through screws or through grooves and projected blocks, making it difficult to disassemble. Sometimes the panel hook or socket/switch surface may become damaged if force is applied improperly, making disassembly inconvenient.

SUMMARY

For the above reasons, I propose a new type of panel for mounting upon the surface of a power supply socket/switch or similar article, which is characterized by a simple structure, convenient disassembly, and a beautiful appearance.

To realize the above purpose, the power supply socket panel comprises a panel enclosure, at least one movable connector, a panel supporter and at least one elastic foot. The panel supporter is mounted to the movable connector, and together they are secured to a power supply socket or switch. The panel enclosure is secured to the panel supporter through the movable connector and the elastic foot is mounted between the panel supporter and the movable connector.

The panel has the advantages of a simple structure, convenient assembly/disassembly, a simple mold-making process and low cost. Furthermore, this panel can be conveniently fitted to various types of power supply sockets/switches and is convenient for electricians with regards to installation and removal.

BRIEF DESCRIPTION OF THE DRAWINGS

The accompanying drawings, which are incorporated in and constitute a part of this specification, illustrate several embodiments of the panel and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
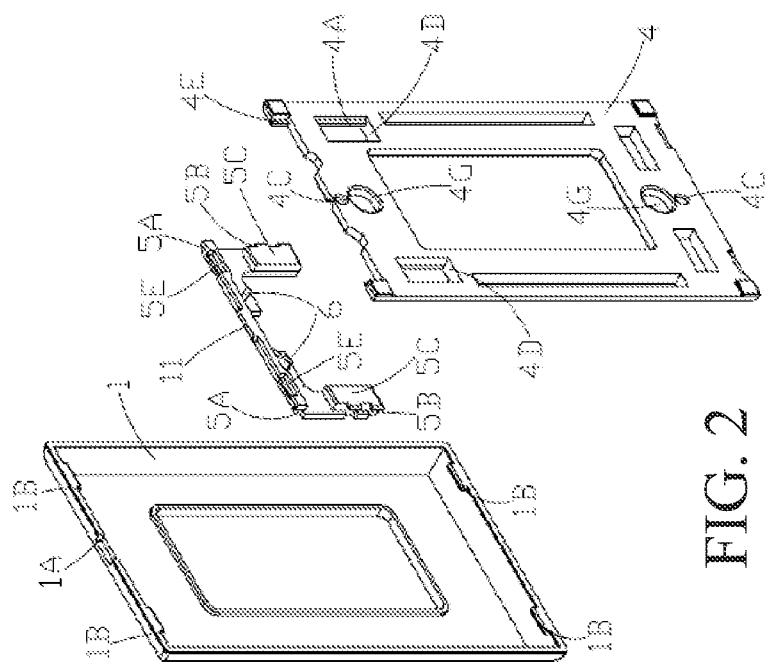
FIG. 1 is an exploded front-view structural diagram of Embodiment 1 of a panel.
Figure 2:
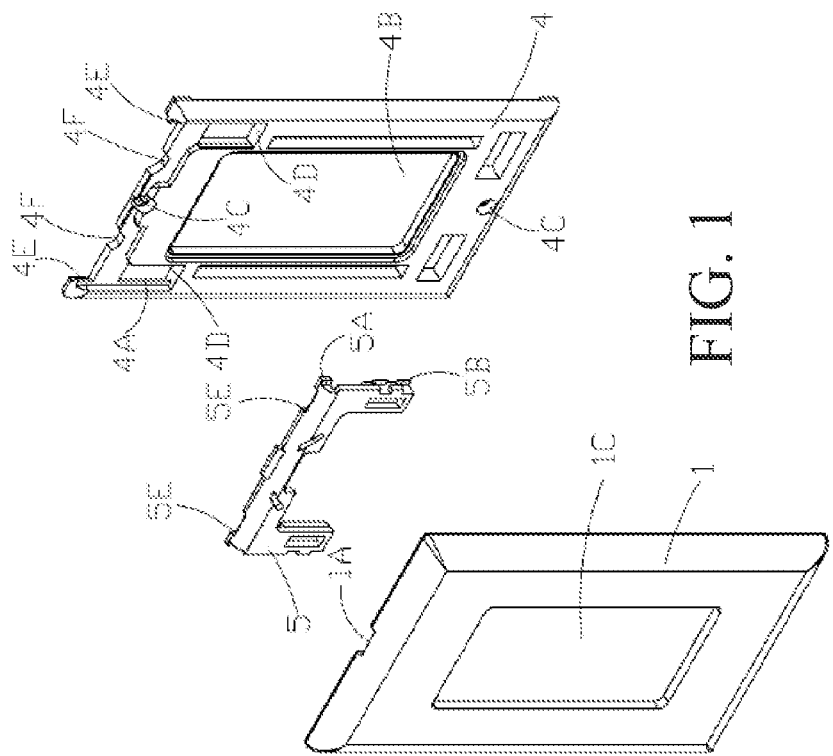
FIG. 2 is an exploded rear-view structural diagram of FIG. 1.
Figure 3:
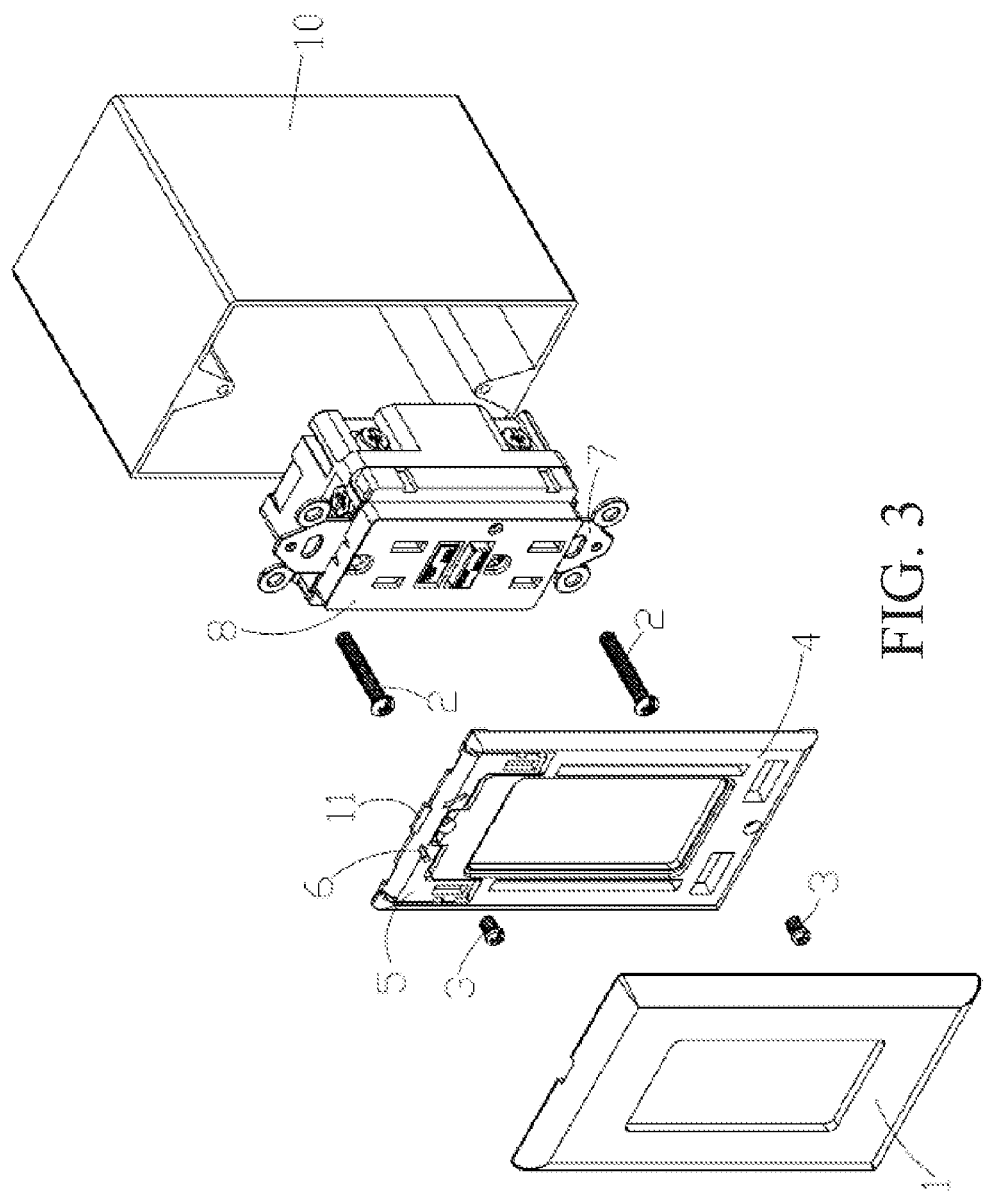
FIG. 3 is an exploded service-state structural diagram of Embodiment 1 of the panel.
Figure 5:
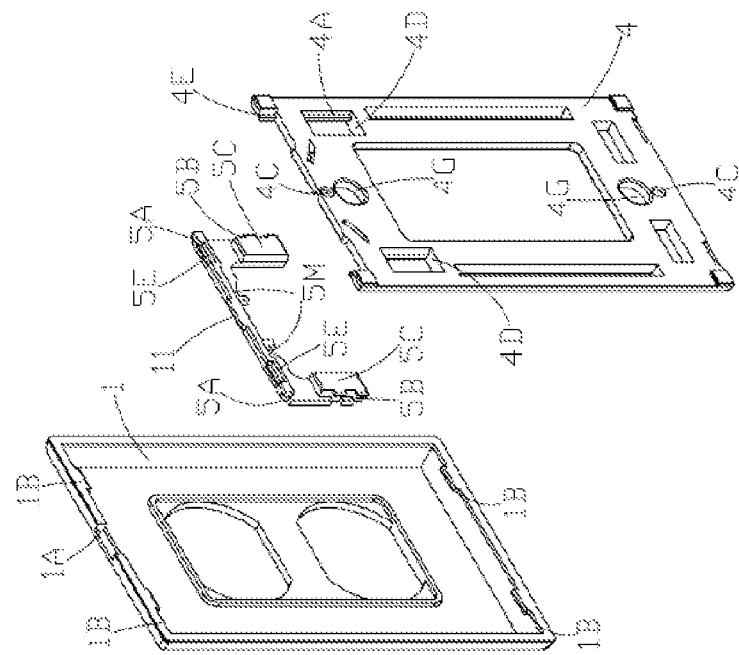
FIG. 5 is an exploded front-view structural diagram of Embodiment 2 of a panel.
Figure 6:
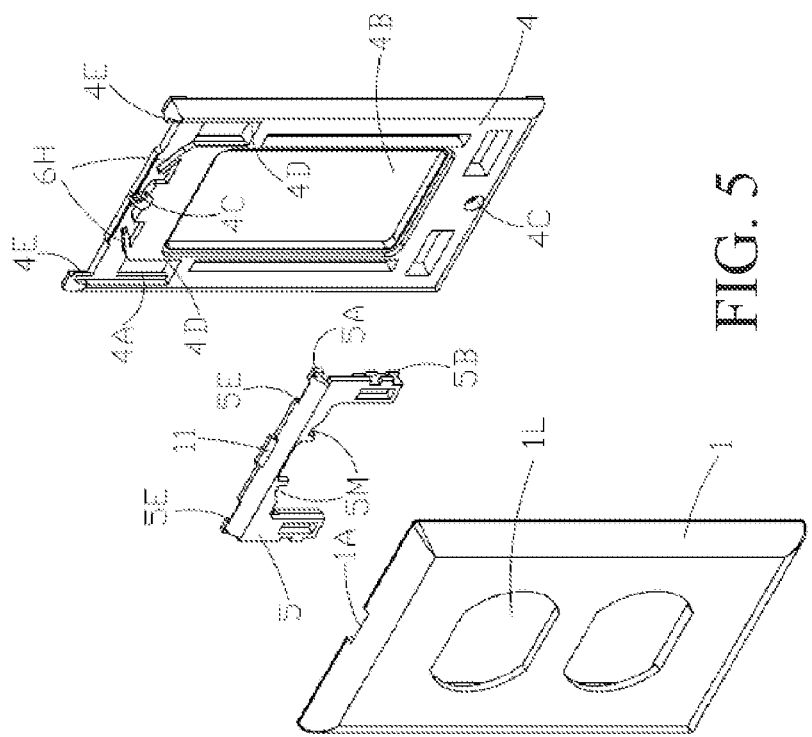
FIG. 6 is an exploded rear-view structural diagram of FIG. 5.
Figure 8:
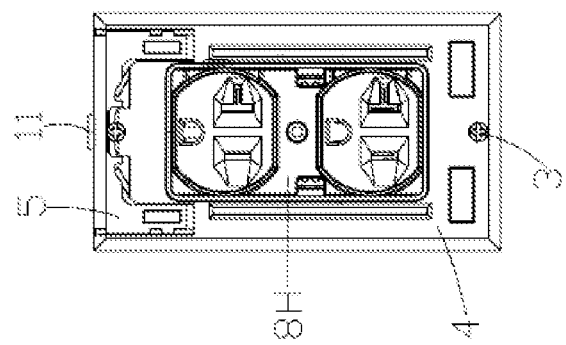
FIG. 8 is a front view of Embodiment 2 after the supporter, lock block and power supply socket have been assembled.
Figure 7:
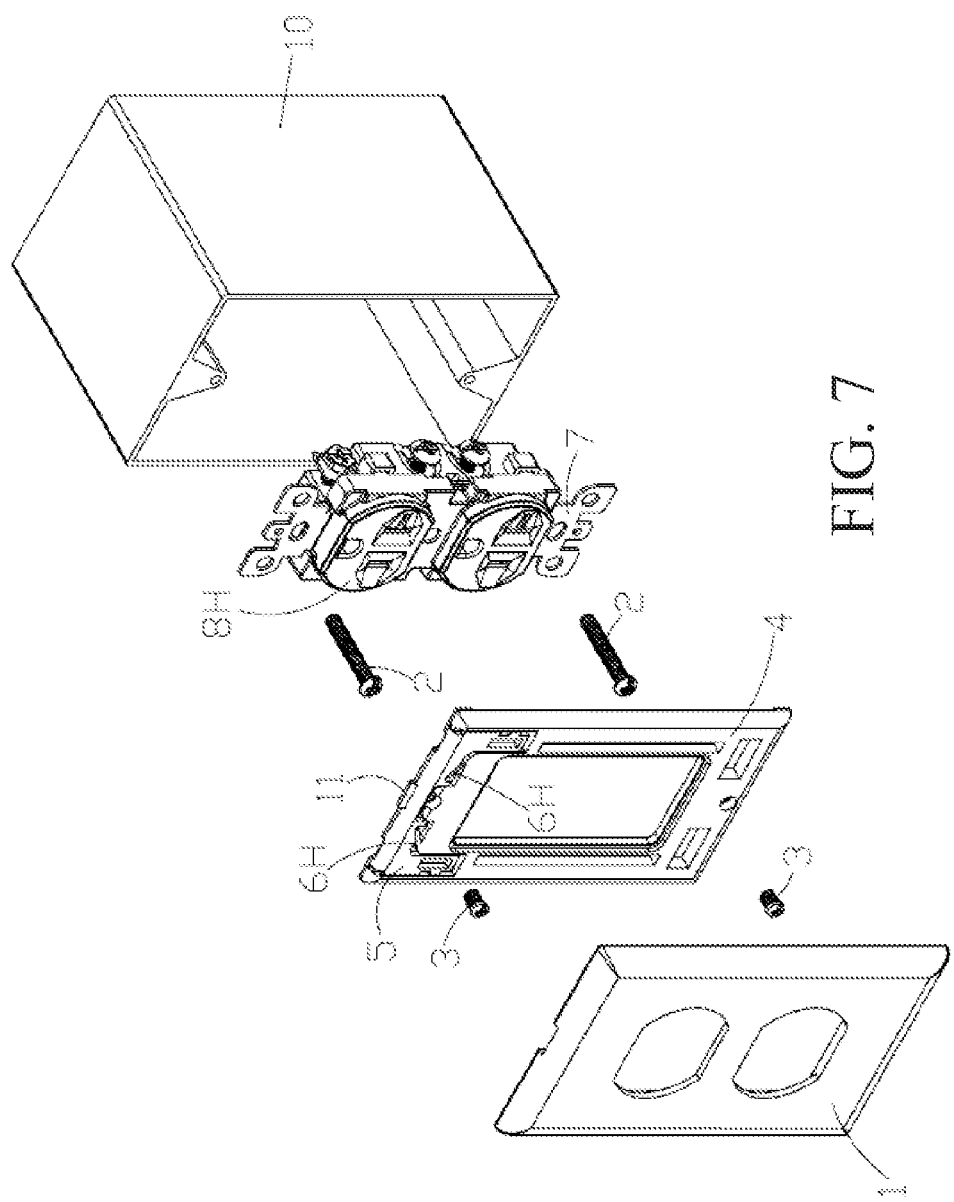
FIG. 7 is an exploded service-state structural diagram of Embodiment 2 of the panel.
Figure 9:
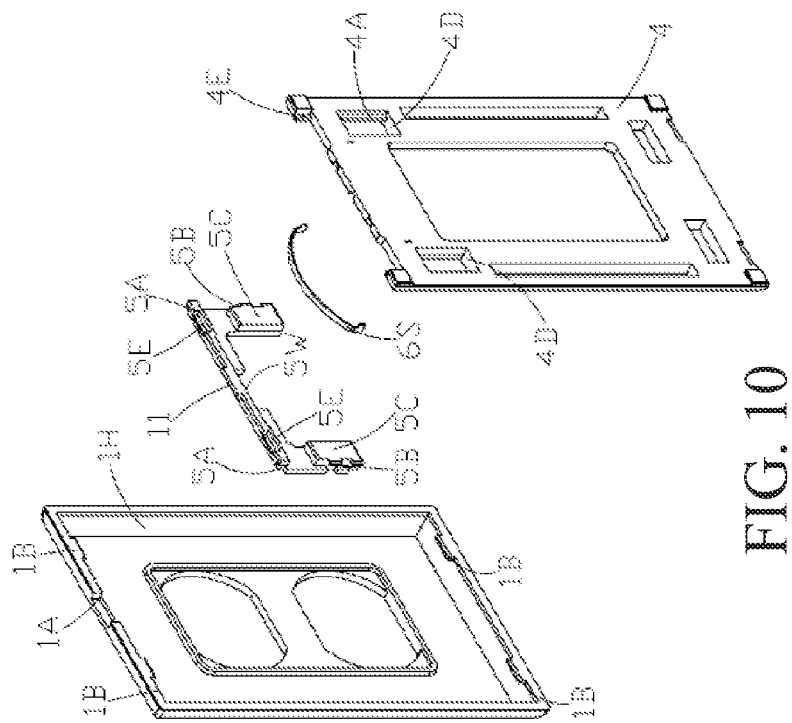
FIG. 9 is an exploded front-view structural diagram of Embodiment 3 of a panel.
Figure 10:
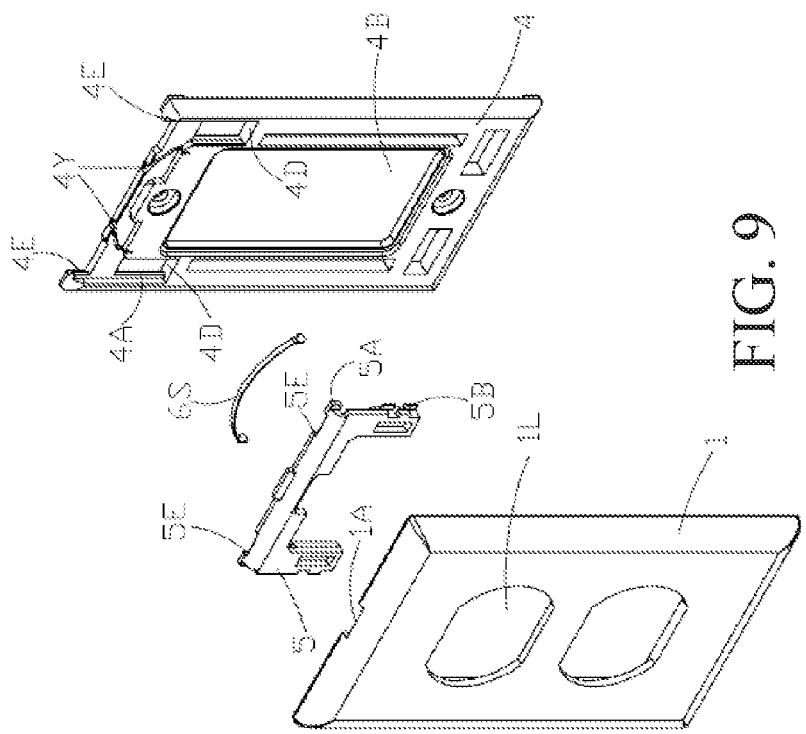
FIG. 10 is an exploded back-view structural diagram of FIG. 9.
Figure 11:
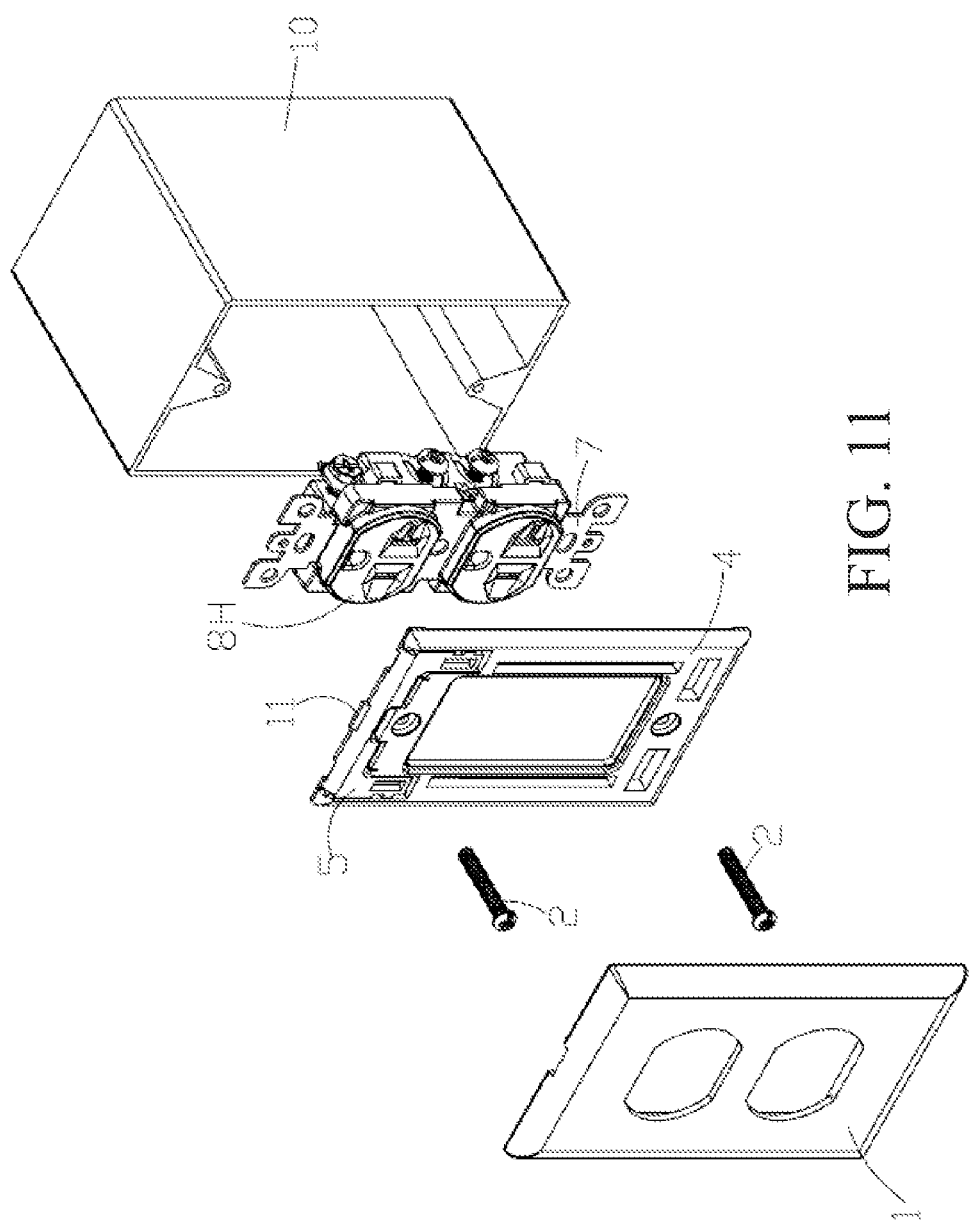
FIG. 11 is an exploded service-state structural diagram of Embodiment 3 of the panel.
Figure 12:
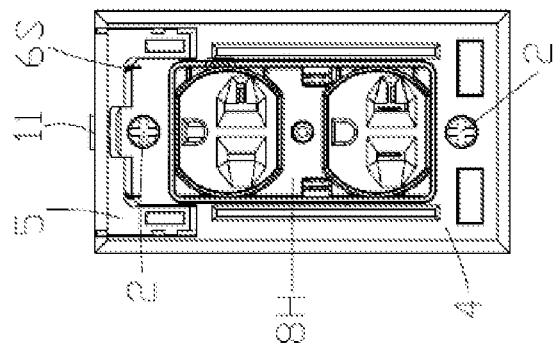
FIG. 12 is a front view of Embodiment 3 after the supporter, lock block and power supply socket have been assembled.

As shown in FIGS. 1, 2 and 3, the panel described in a first Embodiment includes some features common to each of the Embodiments. These features include a panel enclosure 1, at least one moveable connector 5 and a panel supporter 4. The panel supporter 4 is integrated with the moveable connector 5, and is then secured to a power supply socket 8, located in a wall, through screws 3. The panel enclosure 1 is attached at one end of panel enclosure 1 to the panel supporter 4 with blocks and it is attached by pushing the other end slightly and compressing it through the movable connector 5. The movable connector 5 can move to a position to attach with blocks to the other end of the panel enclosure 1. The panel enclosure 1 can be positioned through the moveable connector 5 and can be secured with the panel supporter 4.

The panel supporter may be integrated with the moveable connector, and can then be secured to the power supply socket/switch in the wall. The moveable connector can be attached to the panel supporter in a sliding manner.

The panel also includes at least one elastic foot, which can be mounted between the panel supporter and the moveable connector. In one embodiment, the elastic foot can be located on the rear side of the moveable connector. One end of the elastic foot can be connected to the moveable connector. On the upper part of the panel supporter corresponding to the elastic foot located on the rear side of the moveable connector, a position can be provided to accommodate the elastic foot. In another embodiment, one end of the elastic foot can be secured to the panel supporter instead. On the upper part of the moveable connector corresponding to the elastic foot on the panel supporter, a position can be provided to accommodate the elastic foot. In a third embodiment, the elastic foot can be arched, can be located between the moveable connector and the panel supporter, and can be mounted at the position of the panel supporter.

In each of the embodiments, a presser plate can be mounted on top of the moveable connector. On the left and right sides of the rear side of the moveable connector, fixture blocks can be mounted, respectively. In the left and right walls of the moveable connector, slide grooves can be provided respectively. In the side walls of the fixture blocks, slide grooves can also be provided.

In each of the embodiments, fixture block holes can be provided respectively in the left and right sides of the panel supporter corresponding to the fixture blocks on the rear of the moveable connector. On the inner walls of each of the fixture block holes, a slide rail can be provided. Additionally, on each of the inner walls of the left and right sides of the top of the panel supporter 4, a slide rail can also be provided.

In each of the embodiments, the panel supporter can be integrated with the moveable connector. The panel enclosure can be separated from or can be attached to the panel supporter. The moveable connector can be moved from one position to another.

In each of the embodiments, the panel supporter can be integrated with the moveable connector, and can be, along with the socket or switch, secured into the socket or switch mounting box in the wall through mounting screws. The at least one moveable connector can be integrated with the panel supporter.

As shown in FIGS. 1 & 2, the surface of the panel enclosure 1 is smooth. In the first Embodiment, a through-hole 1C is provided on its surface. This through-hole 1C is preferably sized so that only the power supply jacks or switches are exposed and their use is not affected after the panel enclosure 1 is attached to the panel supporter 4 through the moveable connector 5. At the top wall of the panel enclosure 1, a press opening 1A is provided. Fixture blocks 1B are provided on the rear of the panel enclosure 1; two each on both the top and bottom edges. The fixture blocks 1B on the top edge match with the grooves 5E at the top of the moveable connector 5. The fixture blocks 1B on the bottom edge match with the bottom of the panel supporter 4. Through these fixture blocks, the panel enclosure 1 is attached tightly to the panel supporter 4 and the moveable connector 5.

A presser plate 11 is mounted on the top of the moveable connector 5. Each of the left and right sides of the rear side of the moveable connector 5 has a fixture block 5C mounted. Slide grooves 5A are also provided in each of the left and right walls of the moveable connector 5. Slide grooves 5B are also provided in each of the side walls of the fixture blocks 5C.

A through-hole 4B is provided in the middle of the panel supporter 4. This through-hole 4B is preferably sized so that only the power supply jacks or switches are exposed and their use is not affected after the panel supporter 4 is integrated with the moveable connector 5 and after it is secured to the grounding mounting plate 7 of the power supply jacket 8 through the screws 3.

Fixture block holes 4D are provided in the left and right sides of the panel supporter 4 corresponding to the fixture blocks 5C on the rear of the moveable connector 5. On the inner wall of each of the fixture block holes 4D, a slide rail 4A is provided. Additionally, on each of the inner walls of the left and right sides of the top of the panel supporter 4, slide rails 4E are also provided.

In the first Embodiment, as shown in FIG. 1, the panel includes a moveable connector. Of course, it can also include two moveable connectors 5. These two moveable connectors 5 would be mounted on the top and bottom ends of the panel supporter 4, attaching the panel enclosure 1 to the panel supporter 4.

To facilitate the assembly and disassembly of the panel enclosure 1, the moveable connector 5 and the panel supporter 4, as shown in FIGS. 1 & 2, also includes at least one elastic foot 6. This elastic foot 6 is located on the rear side of the moveable connector 5. In this Embodiment, one end of this elastic foot 6 is connected to the moveable connector 5. On the upper part of the panel supporter 4 corresponding to the elastic foot 6 on the rear side of the moveable connector 5, positions 4F are provided for accommodating the elastic feet 6.

When the moveable connector 5 is attached to the panel supporter 4, the slide grooves 5A and 5B on the two sides of the fixture block 5C in the rear of the moveable connector 5 slide into the slide rails 4A & 4E on the two sides of the panel supporter 4, causing the fixture block 5C of the moveable connector 5 to block the hole 4D of the panel supporter 4. In such a way, the groove 5E of the moveable connector 5 is integrated with the panel supporter 4. At the same time, the elastic foot 6 on the rear side of the moveable connector 5 is secured in the position 4F provided on the upper part of the panel supporter 4.

Figure 4:
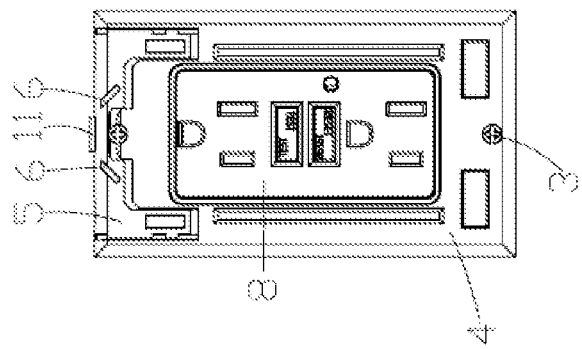
FIG. 4 is a front view of Embodiment 1 after the supporter, lock block and power supply socket have been assembled.

As shown in FIG. 4, before the power supply socket or switch is released from the factory, the moveable connector 5 and the two unfolded elastic feet 6 are assembled together. They are mounted through screws 3 onto the metal grounding mounting plate 7 of the power supply socket/switch body. The panel enclosure 1 is then attached to the moveable connector 5 and the panel supporter 4.

During installation, the electrician first removes the panel enclosure 1. Then he integrates the panel supporter 4 with the moveable connector 5, installs them into the mounting box 10 in the wall through screws 2. Finally, he places one end of the panel enclosure 1 over one end of the panel supporter 4 and pushes the other end of the panel enclosure 1 against moveable connector 5, allowing the fixture block 1B of the panel enclosure 1 to be attached within the groove 5E of the moveable connector 5. With the compression effect of the elastic foot 6, the panel enclosure 1 is attached tightly to the moveable connector 5 and the panel supporter 4.

When it is necessary to remove the panel enclosure 1, the opening 1A of the panel enclosure 1 is pushed gently with an article such as a small screwdriver to depress the moveable connector 5. Under the action of the deformation of the elastic foot 6, the fixture block 1B of the panel enclosure 1 can be separated from the groove 5E on the moveable connector 5 and from the panel supporter 4. In this way, the panel enclosure 1 can be removed.

FIGS. 5-8 are structural diagrams of a second Embodiment. The differences between the first Embodiment and the second Embodiment are as follows: The panel disclosed in the second Embodiment also includes at least one elastic foot 6H. One end of this elastic foot 6H is secured to the panel supporter 4, instead of the moveable connector 5. On the upper part of the moveable connector 5 corresponding to the elastic foot 6H of the panel supporter 4, a position 5M is provided for accommodating the elastic foot 6H.

Another point of difference between the panel disclosed in the first Embodiment and that of the second Embodiment is as follows: The panel enclosure 1 of the panel disclosed in the second Embodiment has two through-holes 1L corresponding to the shape of the power supply jacket 8H, instead of one through hole.

FIGS. 9-12 are the structural diagrams of a third Embodiment. The main difference between the first Embodiment and the third Embodiment is as follows: The panel disclosed in the third Embodiment includes an elastic foot 6S. This elastic foot 6S is arched, and is located between the moveable connector 5 and the panel supporter 4. On the upper part of the panel supporter 4, a groove 4Y is provided to accommodate the elastic foot 6S. The elastic foot 6S is mounted within the groove 4Y of the panel supporter 4.

This panel eliminates the two springs in existing panels for installation and removal, resulting in cost savings and simplification of installation while achieving the same attaching effect. Moreover, the elimination of springs means the elimination of the spring electroplating process, making the production of this panel more environmentally friendly than previous designs.

Although the foregoing invention has been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

In the preceding specification, various preferred embodiments have been described with reference to the accompanying drawings. It will, however, be evident that various other modifications and changes may be made thereto, and additional embodiments may be implemented, without departing from the broader scope of the claims that follow. The specification and drawings are accordingly to be regarded in an illustrative rather than restrictive sense.

I claim:

1. A power supply socket panel comprising:
a panel enclosure;
a panel supporter comprising an elastic foot; and
at least one movable connector comprising an upper part configured to engage the elastic foot from the panel supporter;
wherein:
the panel supporter is configured to mount to the movable connector,
the panel supporter and the movable connector are configured to secure to a power supply socket or switch,
the panel enclosure is secured to the panel supporter through the movable connector, and
the elastic foot is mounted between the panel supporter and the moveable connector.

2. The power supply socket panel of claim 1 further comprising:
a presser plate mounted on a top of the movable connector;
a first fixture block on a left side of the movable connector, the first fixture block comprising a first slide groove; and
a second fixture block on a right side of the movable connector, the second fixture block comprising a second slide groove,
wherein the movable connector further comprises a left wall and right wall and the left wall and right wall of the movable connector each comprise a slide groove.

3. The power supply socket panel of claim 2 wherein:
the panel supporter comprises a first fixture block hole in a right side and a second fixture block hole in a left side and the first and second fixture block holes each comprise an inner wall with a slide rail.

4. The power supply socket panel of claim 3 wherein:
the panel enclosure is configured to separate from or attach to the panel supporter, and
the moveable connector is movable from a first position to a second position.

5. The power supply socket panel of claim 4 wherein:
the panel supporter and movable connector are configured to secure to a power supply socket or switch through at least a pair of mounting screws.

6. A power supply socket panel comprising:
a panel enclosure;
at least one movable connector comprising an elastic foot; and
a panel supporter comprising an upper part configured to accommodate the elastic foot;
wherein:
the panel supporter is configured to mount to the movable connector,
the panel supporter and the movable connector are configured to secure to a power supply socket or switch,
the panel enclosure is secured to the panel supporter through the movable connector,
the elastic foot is mounted between the panel supporter and the moveable connector, and
the elastic foot is located on a rear side of the moveable connector which faces the panel supporter.

7. The power supply socket panel of claim 6 wherein:
a presser plate mounted on a top of the movable connector;
a first fixture block on a left side of the movable connector, the first fixture block comprising a first slide groove; and
a second fixture block on a right side of the movable connector, the second fixture block comprising a second slide groove,
wherein the movable connector further comprises a left wall and right wall and the left wall and right wall of the movable connector each comprise a slide groove.

8. The power supply socket panel of claim 7 wherein:
the panel supporter comprises a first fixture block hole in a right side and a second fixture block hole in a left side and the first and second fixture block holes each comprise an inner wall with a slide rail.

9. The power supply socket panel of claim 8 wherein:
the panel enclosure is configured to separate from or attach to the panel supporter, and
the moveable connector is movable from a first position to a second position.

10. The power supply socket panel of claim 9 wherein:
the panel supporter and movable connector are configured to secure to a power supply socket or switch through at least a pair of mounting screws.

11. A power supply socket panel comprising:
a panel enclosure;
at least one movable connector comprising a left wall and a right wall and the left wall and the right wall of the movable connector each comprise a slide groove;
a panel supporter;
at least one elastic foot,
a presser plate mounted on a top of the movable connector;
a first fixture block on a left side of the movable connector, the first fixture block comprising a first slide groove; and
a second fixture block on a right side of the movable connector, the second fixture block comprising a second slide groove,
wherein:
the panel supporter is configured to mount to the movable connector,
the panel supporter and the movable connector are configured to secure to a power supply socket or switch,
the panel enclosure is secured to the panel supporter through the movable connector, and
the elastic foot is mounted between the panel supporter and the moveable connector.

12. The power supply socket panel of claim 11 wherein:
the panel supporter comprises a first fixture block hole in a right side and a second fixture block hole in a left side and the first and second fixture block holes each comprise an inner wall with a slide rail.

13. The power supply socket panel of claim 12 wherein:
the panel enclosure is configured to separate from or attach to the panel supporter, and
the moveable connector is movable from a first position to a second position.

14. The power supply socket panel of claim 13 wherein:
the panel supporter and movable connector are configured to secure to a power supply socket or switch through at least a pair of mounting screws.

15. A power supply socket panel comprising:
a panel enclosure;
at least one movable connector;
a panel supporter comprising an upper part with a groove configured to accommodate an elastic foot; and
at least one elastic foot mounted in the groove,
wherein:
the panel supporter is configured to mount to the movable connector,
the panel supporter and the movable connector are configured to secure to a power supply socket or switch,
the panel enclosure is secured to the panel supporter through the movable connector, and
the elastic foot is mounted between the panel supporter and the moveable connector.

16. The power supply socket panel of claim 15 wherein:
a presser plate mounted on a top of the movable connector;
a first fixture block on a left side of the movable connector, the first fixture block comprising a first slide groove; and
a second fixture block on a right side of the movable connector, the second fixture block comprising a second slide groove,
wherein the movable connector further comprises a left wall and right wall and the left wall and right wall of the movable connector each comprise a slide groove.

17. The power supply socket panel of claim 16 wherein:
the panel supporter comprises a first fixture block hole in a right side and a second fixture block hole in a left side and the first and second fixture block holes each comprise an inner wall with a slide rail.

18. The power supply socket panel of claim 17 wherein:
the panel enclosure is configured to separate from or attach to the panel supporter, and
the moveable connector is movable from a first position to a second position.

19. The power supply socket panel of claim 18 wherein:
the panel supporter and movable connector are configured to secure to a power supply socket or switch through at least a pair of mounting screws.

* * * * *